Jan. 13, 1970     R. DAVIDSON ET AL     3,489,679
ULTRASONIC-CLARIFICATION OF LIQUIDS
Filed Aug. 15, 1967     7 Sheets-Sheet 1

FIG_1A

FIG_1B

INVENTORS.
ROGER DAVIDSON
WARREN G. PALMER
TOM H. FORREST
BY
F. W. Anderson
C. E. Tripp
ATTORNEYS

FIG_2

FIG_3

INVENTORS.
ROGER DAVIDSON
WARREN G. PALMER
TOM H. FORREST
BY
F. W. Anderson
C. E. Tripp
ATTORNEYS United States Patent Office 3,489,679
Patented Jan. 13, 1970

3,489,679
ULTRASONIC CLARIFICATION OF LIQUIDS
Roger Davidson, San Jose, and Warren G. Palmer, Saratoga, Calif., and Tom H. Forrest, Evanston, Ill., assignors to FMC Corporation, San Jose, Calif., a corporation of Delaware
Filed Aug. 15, 1967, Ser. No. 660,683
Int. Cl. B01d 35/20
U.S. Cl. 210—19                                24 Claims

ABSTRACT OF THE DISCLOSURE

Organic and other solids are removed from a dilute aqueous suspension, such as the secondary effluent from a sewage treatment plant, for example, by passing the suspension through a screen to deposit solids on the screen, and passing the solids-laden screen through an isolated water bath wherein the solids are stripped from the screen and concentrated by forces resulting from ultrasonic vibrations imparted to the water bath adjacent to the screen. The solids are caused to settle in a region of the bath below the screen, and are removed as a relatively concentrated slurry.

BACKGROUND OF THE INVENTION

Field of the invention

This invention relates to the removal of suspended solids from liquids to effect clarification thereof.

The invention finds particular applicability to the clarification of liquids containing minute particles of suspended solids including organic materials in amounts not exceeding about 100–150 parts per million (p.p.m.), which are normally difficult to remove from the host liquid. Examples of solids containing liquids to which the invention is particularly applicable are sewage; the effluent from a conventional sewage activated sludge process where the solids content including activated sludge solids is in the order of 20–30 p.p.m.; the effluent from a trickling filter clarifier in a sewage treating process; water containing algae and/or other minute organic material which must be removed to provide a desirably purified water suitable for human consumption; industrial waste liquids, and the like.

Description of prior art

Smales 512,231—Jan. 2, 1894: A double walled cylinder, open at one end, is provided with radial discharge pipes leading to a valved discharge trunnion at the other end, and the cylinder is mounted to rotate in a tank (cistern). An endless band filter cloth travels with the cylinder through the tank and then enters at the top of a "washing machine" and travels therethrough to the bottom thereof, and then back to the tank. Solids on the filter material are said to be cleaned therefrom as the same passes through the "washing machine."

Liquid in the tank to be filtered flows radially inwardly through the filter material and discharge pipes, and out through the valved trunnion. The speed of the band filter may be regulated so that the same is practically choked with arrested solids during its travel through the tank in advance of its entry into the "washing machine."

Kleesattel et al., 3,056,698—Oct. 2, 1962: Corrugated screen filter elements for hydraulic systems are cleaned for reuse in the system. An element to be cleaned is immersed in a bath of solvent in minutely spaced relation (0.001" to 0.040" spacing) to the free end of an ultrasonically vibrated magnetostrictive transducer section, which produces hyper-intense cavitation of a limited column of cleaning fluid. A cleaning fluid circulation system is connected to the filter element for first driving cleaning fluid outwardly through the filter element and to then apply a suction for backwashing through the element. The filter element is rotated during cleaning so that the transducer scans the element. The ultrasonic transducer is cooled by a turbine type fan.

Miles 3,289,848—Dec. 6, 1966: A vacuum trunnion drum rotates in a slurry tank and the filter cake deposits on the outside of a traveling filter belt trained around the drum. The belt passes over a bowed roller to loosen the cake and the loosened cake is discharged into a hopper. The cake-free filter belt continues on past water spray pipes for cleaning the belt of fine particles, the wash water being caught in a trough.

Jung 2,963,158—Dec. 6, 1960: A multi-cell rotary filter cylinder rotates past a series of chambers for filtering pulp, and drying and discharging the residue. Before the filter residue is dried and discharged it is washed in a chamber through which wash water is circulated, and if desired the washing is aided by "ultra sound" from an ultra sound generator in the wash chamber.

Neuhaus et al., 2,919,215—Dec. 29, 1959: The side walls of a liquid tank (e.g. a clothes washing machine) are vibrated and the liquid level adjusted to tune the chamber for resonance. Where the walls are ferromagnetic they are vibrated by electromagnets operating through an air gap on about 50 cycle alternating current. Nonmagnetic walls are vibrated by fixing a solenoid armature directly onto the walls.

Peterson 3,305,481—Feb. 21, 1967: The clogging of a sieve or filter for very fine grained suspensions in liquids by the formation of an impervious layer of the suspended material on the sieve during the filtering operation (e.g. marine mining) is prevented by immersing an ultrasonic probe in the liquid being filtered. It is stated that the method strongly suppresses flocculation.

Brown 3,301,535—Jan. 31, 1967: Ultrasonic transducers are mounted on the bottom of a liquid tank such as a sonic cleaning tank. Holes are formed in the tank bottom for receiving rubber O-ring washers, and the transducers project through the washers.

BRIEF SUMMARY OF THE INVENTION

Organic and other solids in suspension in an aqueous medium in a tank containing a movable screen are caused to impinge on the screen and be deposited thereon as the liquid passes through the screen, and thereafter the screen, carrying the deposited solids, is moved out of the tank and to and through the upper portion of a water bath isolated from the tank. In the water bath the solids on the screen are subjected to loosening forces as the result of ultrasonic vibrations imparted to the water bath adjacent to the screen, whereby the deposited solids are stripped from the screen. While still in the water bath and under the influence of the ultrasonic vibrations, the stripped solids are caused to settle in the region of the bath below the screen and to concentrate in the bottom of the bath, and thereafter the concentrated solids are removed from the bath.

In the practice of the invention for the removal of solids in suspension in water, sewage and industrial waste materials, the suspension is first introduced into a tank of relatively large volume containing a section of an endless movable screen which travels from the tank to the isolated water bath. The bath has a relatively small volume, so that after the solids are deposited on the screen within the tank and are carried to the water bath where the solids are stripped from the screen and concentrated at the bottom of the water bath as described, the clean portion of the screen is returned to the tank for further removal of solids, and continuously or from time to time, as desired, the concentrated solids are removed from the water bath of the unit for disposal.

In the small volume water bath the organic and other solid materials are caused to settle and to compact, agglomerate or flocculate during this settling process, while undergoing ultrasonic action. Thus, amongst other things, the bath acts as a chamber for the concentration of solids in the bottom thereof in the form of a relatively thick undisturbed slurry with the water in the bath. This slurry of concentrated organic material is pumped out of the bed and only enough water (which may be either the influent or the clarified effluent from the main tank) need be added to the bath to make up or replace the water carried out with the slurry. The volume of make-up water required represents only a very small fraction of the total volume of water that is clarified by the unit.

The ultrasonic vibrations imparted to the water bath strip the solids from the screen by cavitation phenomena created in the water of the bath. In the preferred embodiment the ultrasonic vibrations are imparted directly to a wall of the bath by electromagnetic units. Some of the electric power supplied to the units is converted into heat by resistance and eddy current losses. Thus, heat is conducted to the water of the bath and raises its temperature above ambient temperature, thereby increasing the cavitation effect and rendering the screen stripping process more efficient.

Where the invention is practiced for the removal of solids in suspension in a sewage actuated sludge process, it may be desirable to return a portion of the concentrate or slurry from the bath to an aeration chamber in the sewage system, wherein activated sludge is formed by biodegradation. It has been found that the action of the ultrasonic vibrations on the organic materials in the screen cleaning and material concentration bath increases the biodegradability of the organic materials, thereby enhancing the effectiveness of the aeration chamber.

The manner by which these advantages of the invention may be attained will be apparent from a detailed description of an embodiment of the invention which follows, and the accompanying drawings.

DETAILED DESCRIPTION

Clarification problems

This invention will be described in detail in connection with the final clarification of aqueous material in the form of the secondary effluent from the final settling tank of an activated sludge sewage treatment plant, although under the broader aspects of the invention it is not limited to this application but is applicable in general to the treatment of other waste liquids, water, etc., containing organic and other solid materials in amounts not exceeding about 100–150 p.p.m., as already indicated.

The purification and clarification of the secondary or final effluent from an activated sludge or other sewage treatment plant is receiving increasing attention by industry and the State, because of pollution problems presented by these effluents. Many industrial liquid wastes containing suspended organic solids which are discharged into sewers, into natural bodies of water, and the like, also present problems inimical to human and animal life, and control of these wastes is likewise of increasing importance.

For example, the secondary effluent from an activated sludge sewage treatment plant has suspended therein colloidal biological and bacteriological solids in amounts of about 20–40 p.p.m. which, when discharged into a stream, lake or the like consume oxygen from the receiving water while undergoing decomposition therein, and thus have an adverse effect on the animal life in the water. Also, these organic materials serve as nutrients for plant growth in the receiving water, thereby creating clogging and other problems.

The present invention is capable of clarifying these secondary effluents to provide waste liquids containing about 8–10 p.p.m, and even less, of these solids, which under present standards are acceptable for discharge into streams, rivers and lakes where control and preservation of animal and marine life is important.

The volumes of effluent from an activated sewage treatment plant are large, even in a small city or municipality, and land values in the zone of the treatment plant are generally such that it is much too costly to provide contiguous large area final sewage treatment facilities. The problem is further complicated by the variable climates at the plant sites in different parts of the country. The apparatus of the present invention is relatively small and may be housed in a small shelter or a relatively small area of an existing building, and since it can handle for clarification large volumes of secondary effluent from an activated sludge sewage treatment process, for example, it presents substantial economic advantages which indicates its use for clarification of liquids of the kinds herein contemplated.

The apparatus of the present invention can be operated continuously and need not be placed on standby duty for scheduled cleaning, reactivation or the like. Also, the apparatus can be constructed in module form to handle loads of any size, and a system for clarifying secondary effluents of even a large city, including working space and controls, etc., will occupy a relatively small area, as compared with the area of a sand filter or lagoon adequate to do an equivalent job, for example.

Arrangement in a typical sewage system

Figure 1A:
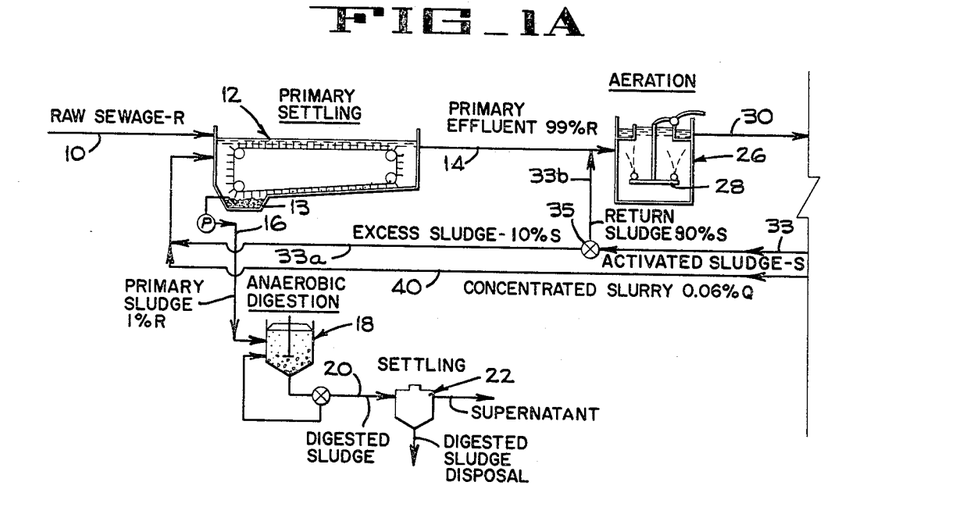
FIGURES 1A and 1B are schematic diagrams of a sewage treatment plant embodying apparatus of the present invention.
Figure 1B:
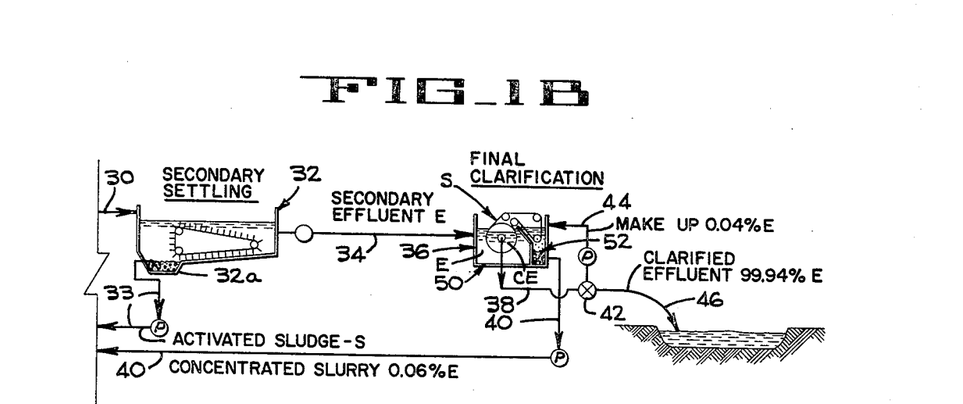
Figure 2:
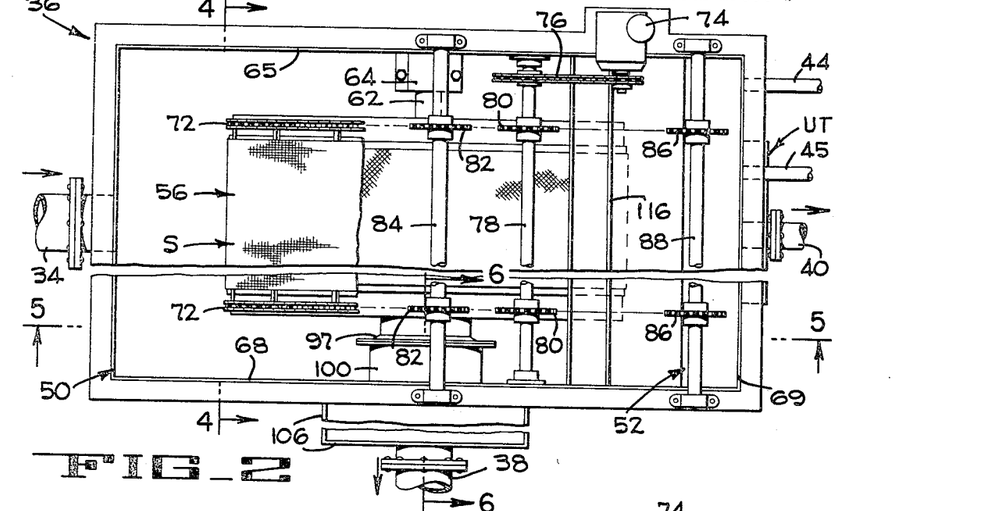
FIGURE 2 is a top plan of the clarifying and solids-concentrating apparatus of the present invention, with a portion of the screen broken away for clarity.

FIGURES 1A and 1B show the apparatus of the present invention connected into a typical sewage treatment plant of the activated sludge type, now in general use. The details of the sewage treatment plant itself are not critical to the invention, and hence the same are shown diagrammatically and will be described in a general way.

As seen in FIGURE 1A, raw sewage R (from which grit and other large solids have been removed) is introduced into the system by a line 10 leading to a primary settling tank 12 wherein the primary sludge settles to a basin 13, and the primary effluent is drawn off through a line 14. The primary sludge may be pumped through line 16 into an anaerobic digestion tank 18 wherein the sludge undergoes anaerobic digestion, or it may otherwise be disposed of. By way of example only, in a typical operation, for each million gallons of raw sewage R, there will be about 990,000 gallons of primary effluent and about 10,000 gallons of primary sludge, as indicated by the legend "99%R" and "1%R" on lines 14 and 16 in FIGURE 1A. The digested sludge is withdrawn from the anaerobic digestion tank through line 20 and introduced into a settling tank 22 where the sludge is permitted to settle. From the settling tank the de-watered, settled sludge is removed for disposal, and the supernatant liquid is withdrawn and may be reintroduced into the system for use in accordance with known techniques. An anaerobic digestion system of the type just described and its relation to a sewage treatment plant is disclosed in detail in the patent to Forrest, 2,777,819, Jan. 15, 1967, incorporated herein by reference.

Primary effluent line 14 connects to aeration tank 26 containing air diffusers 28 through which oxygen is supplied to the effluent and to the admixed return activated sludge solids, to provide the oxygen required by the organisms therein. The aerated mixed liquors from aeration tank 26 are withdrawn through line 30, and passed to secondary settling tank 32 (FIG. 1B). Here, activated sludge solids in suspension settle out into catch basin 32a, from which they are pumped through discharge line 33 to proportioning valve 35 where they are divided so that about 10 percent of the sludge S, sometimes termed "excess" or "waste" sludge, is directed by line 33a back into the primary settling tank 12. The remaining about 90% of the activated sludge S, i.e., the "return" or "seed" sludge, is directed by line 33b back into the aeration tank 26. The percentages of sludge given herein are by way of example, and are not critical to the invention.

Secondary effluent is pumped from settling tank 32 through feeder line 34 and enters the final clarification unit 36 of the present invention, where suspended sewage solids are removed from the effluent and concentrated at the bottom of concentrating chamber 52 in the form of a slurry, in the manner to be described.

Clarified effluent is withdrawn from final clarification unit 36 through line 38, either by a pump (not shown) or by gravity. The clarified effluent is relatively pure, containing about 8–10 p.p.m. and even less of sewage solids, and can be diverted directly to natural bodies of water through line 46, if desired.

Concentrated slurry is pumped from the bottom of concentration chamber 52 through line 40 and, in the system illustrated, is directed back into primary settling tank 12. A portion of the clarified effluent from clarification unit 36 is pumped through proportioning valve 42 and line 44 to concentrating chamber 52 in the unit 36, and used as make-up water to replace that withdrawn in the slurry. In a typical system, for example, if in a given time the quantity of secondary effluent flowing in line 34 is considered to be "E" by volume, the amount of make-up water required in line 44 is about 0.04% of E, so that about 99.94% of E will be discharged from the clarification unit as clarified effluent. An overflow pipe 45 (FIGS. 5, 12 and 13) is provided for limiting the liquid level in the chamber 52, thus precluding flow-back into main tank 50 over partition 51 which separates the concentrating chamber from the main tank.

Construction of the apparatus

Various details of a preferred embodiment of an apparatus for final clarification of secondary sewage effluent or similar suspensions appear in FIGURES 2–11. Of these figures, FIGURES 2–5 show the general construction of the device and FIGURES 6–11 show various details thereof. Referring to FIGURES 2–5, final clarification unit 36 comprises a main tank 50 of rectangular form which is partitioned at 51 to provide a treatment or concentrating chamber 52. Solids suspended in secondary effluent E in main tank 50 are picked up by a moving endless screen S, and transported into treatment or concentrating chamber 52. The screen S wraps around about three quarters of the periphery of rotary drum 56, which supports the screen without interfering with the transfer of liquid therethrough to the interior of the drum. The clarified liquid, effluent CE (FIGURE 5) is drawn out of the drum through the line 38 (FIGURE 1B). Preferably the screen is formed of a fine mesh woven nylon or vinyl fabric, but it may be made of other suitable materials including stainless steel wire. For example, if a square weave nylon fabric is employed the screen will be in the range of about 1000 to 400 mesh, providing openings of 2 to 40 microns, respectively, where a micron is taken to be 0.001 millimeter.

Drum 56 comprises a pair of end plates 58, 60 (FIGURE 5) which are mounted on axle 62, and that end of the axle 62 at the side plate 58 is supported in bearing 64 (FIGURE 4) mounted on the side wall 65 of the main tank. The other end of the axle 62 is supported on bearing 66 bolted to narrow plate 67 (FIGURES 6 and 7) welded to the opposite side wall 68 of the main tank. The plate 67 spans an opening in tank wall 68, leaving openings 70 (FIGURE 7) for the discharge of clarified effluent CE.

The screen S is mounted between spaced side chains 72 (FIGURES 2, 8 and 9) which are driven to move the screen and transfer the screened solid organic material from main tank 50 to concentrating chamber 52, and this travel of the screen frictionally rotates drum 56. As will be seen, drum 56 is constructed so that liquid can flow from outside of its periphery to its interior, the liquid being withdrawn from the drum interior. This will be referred to as a "radial feed drum".

The chains 72 for the screen S are driven by variable speed gearmotor assembly 74 (FIGURES 2, 3 and 5), chain and sprocket drive 76, and countershaft 78. The countershaft mounts spaced chain guide pulleys 80 (FIGURES 2 and 3) which are aligned with a pair of guide pulleys 82 on idler shaft 84 and with another pair of guide pulleys 86 on idler shaft 88. Within treatment or concentrating chamber 52 is a fourth pair of idler pulleys 90 (FIGURES 3 and 5) mounted on idler shaft 92 supported on the opposed side walls of the chamber. It will be noted that pulleys 90 are well above the bottom of concentrating chamber 52, and as will be seen, this provides a well or basin for accommodating agglomeration and concentration of the solids removed from the screen, as well as providing for a bed of concentrated slurry at the bottom of the chamber.

The construction by which drum 56 serves as a radial feed drum will now be described.

Figure 5:
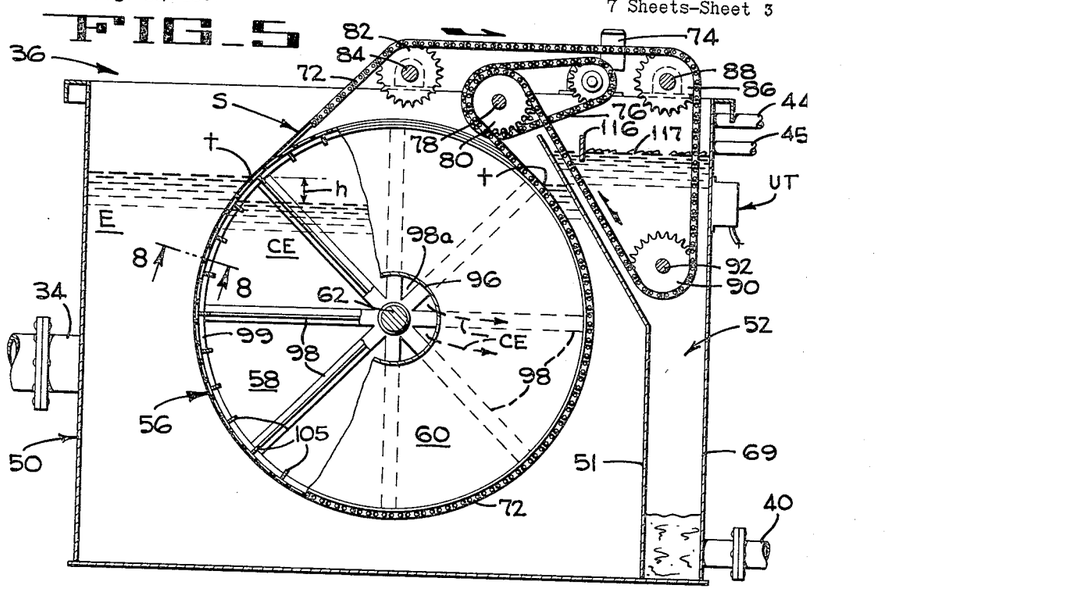
FIGURE 5 is a longitudinal section through the apparatus taken on line 5—5 of FIGURE 2, with a portion of a drum side wall broken away.
Figure 6:
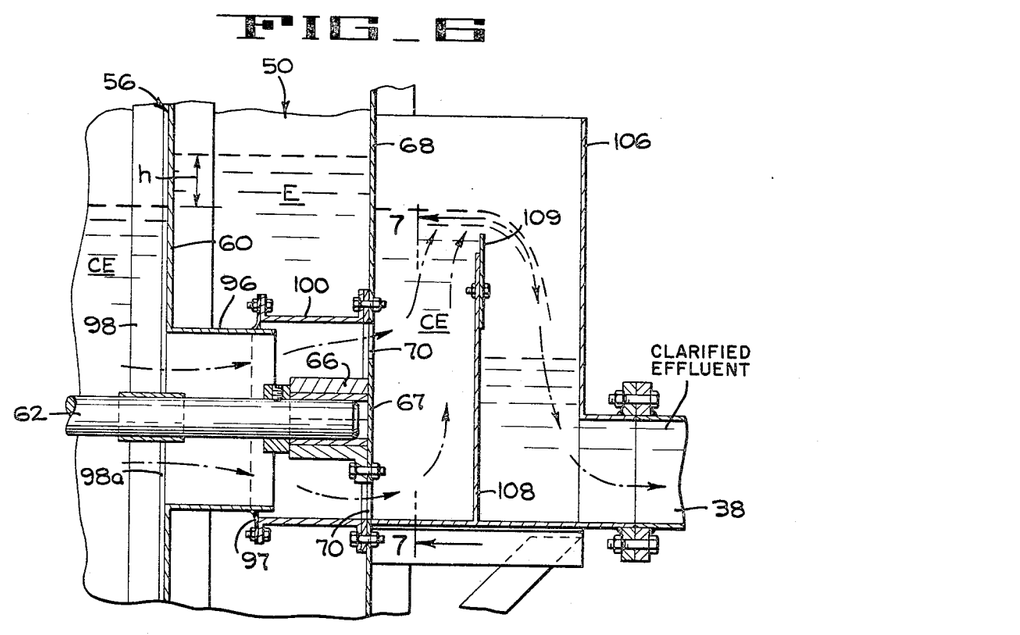
FIGURE 6 is a fragmentary enlarged section through the discharge portion of the apparatus, taken on line 6—6 of FIGURE 2.

As best seen in FIGURE 6, drum side plate 60 at the outlet end of the drum is provided with an axial tubular projection 96 for conducting clarified effluent CE out of the interior of the drum. The drum axle 62 supports the drum at this end by means of radial spokes 98 (best seen in FIGURE 5), which spokes extend between the axle and a peripheral flange 99 of the drum. Similar spokes are provided at the plate 58 at the other end of the drum. The gaps 98a between spokes 98 (FIGS. 5 and 6) give access to the tubular projection 96 for the clarified effluent CE, as indicated by the dashed arrows in FIG. 6.

Figure 7:
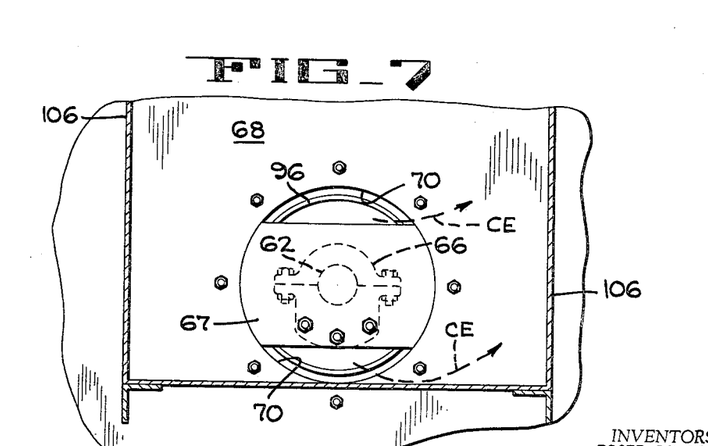
FIGURE 7 is a section taken on line 7—7 of FIGURE 6, showing the support for the drum at the discharge mouth of the apparatus.

The tubular projection 96 rotates with the drum (FIG. 6), and makes a rotary joint with a stationary tubular conduit 100 projecting inwardly from side wall 69 of the main tank. The free end of the tutular conduit 100 carries an annular rubber seal 97 for sealing engagement with the drum tubular projection 96. As previously explained, water flowing through the tubes 96 and 100 continues out through the openings 70 (FIG- URE 7) between the main tank sidewall 68 and the bearing mounting plate 67.

Figure 3:
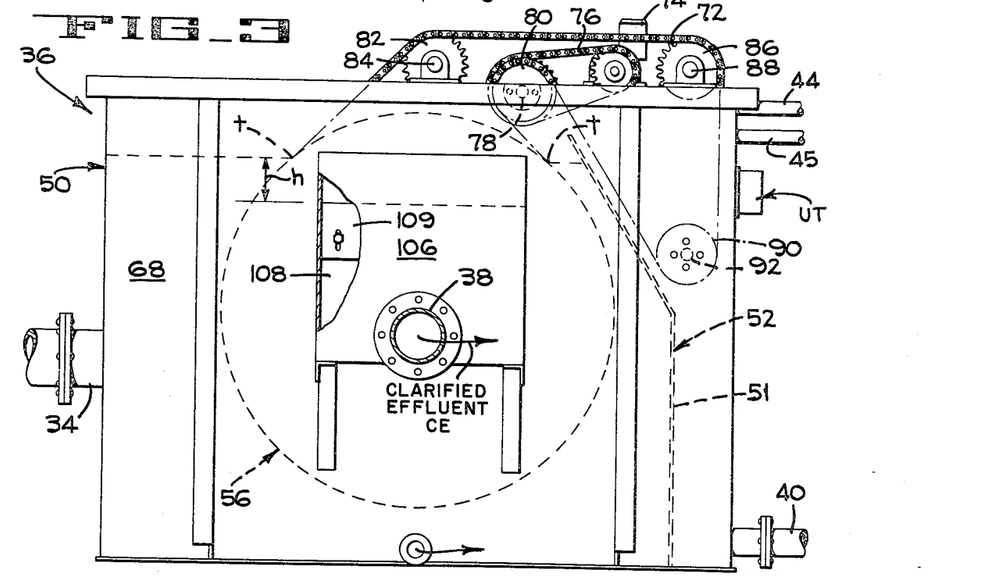
FIGURE 3 is a side elevation of the apparatus, looking at the clarified effluent discharge side thereof.
Figure 4:
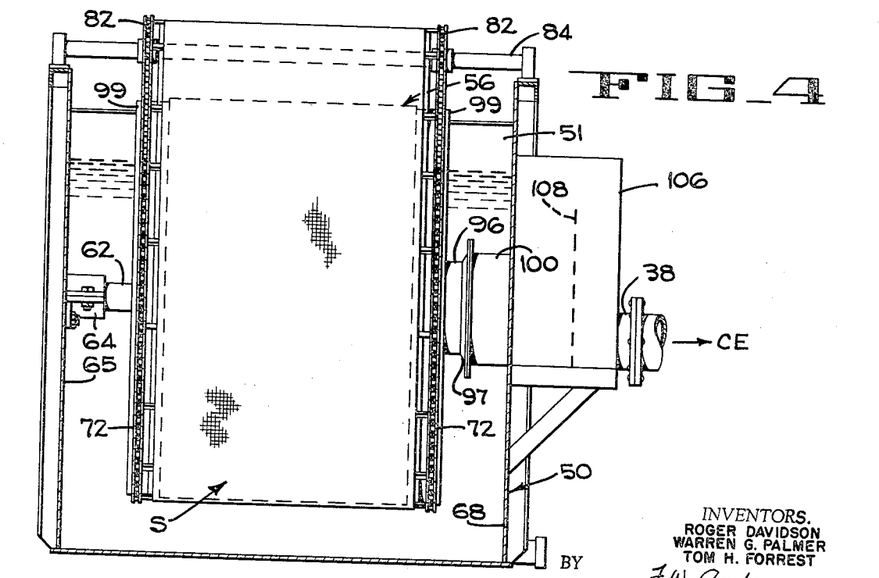
FIGURE 4 is a transverse section through the apparatus taken on line 4—4 of FIGURE 2.
Figure 12:
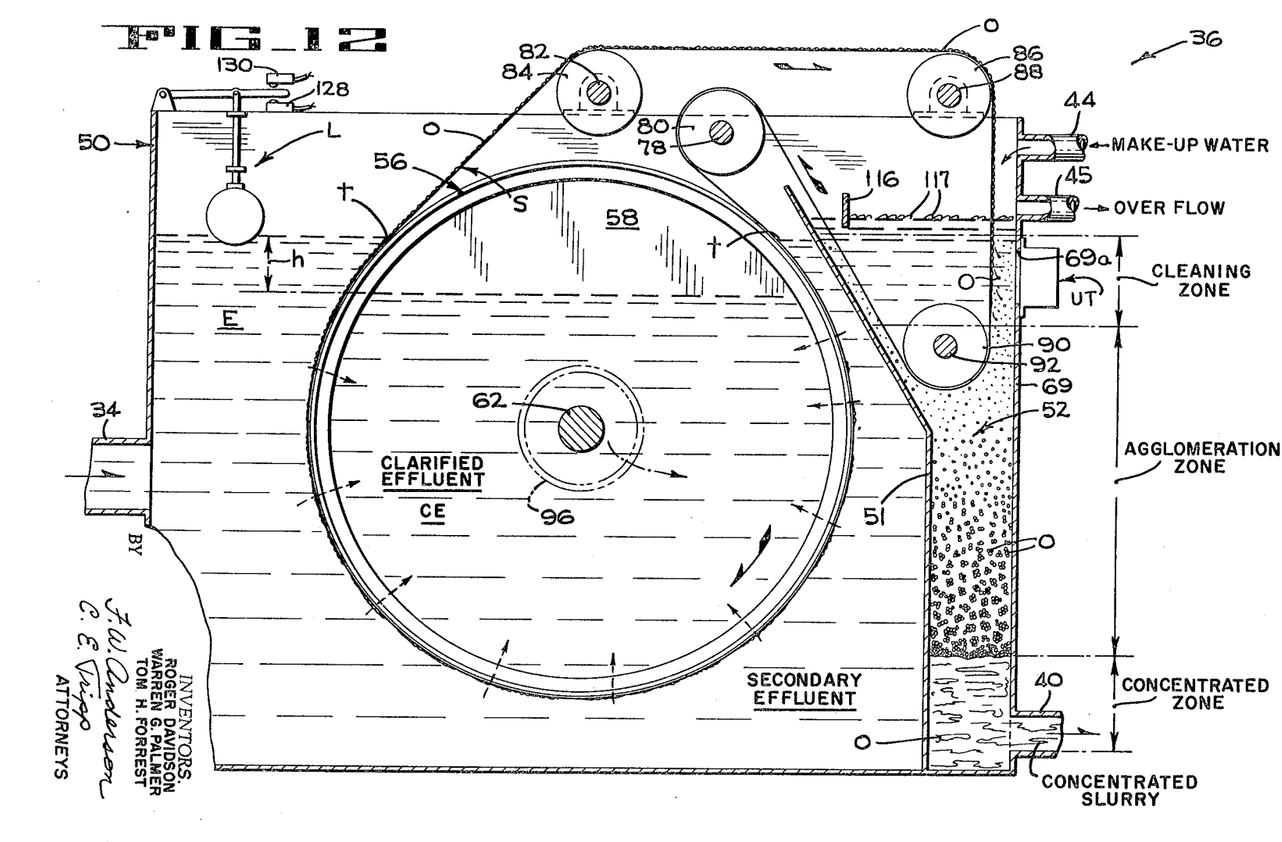
FIGURE 12 is an enlarged schematic diagram illustrating the operation of the invention. This figure also illustrates a modified form wherein operation can be controlled by a float liquid level control unit.

A simple box-type weir and baffle assembly is provided at the clarified effluent outlet for adjusting the head $h$ across the screen S within the main tank. A box 106 (FIG. 6) surrounds the clarified effluent outlet structure just described, including internal baffle or weir 108 which terminates in adjustably mounted weir plate 109. The weir plate can be raised or lowered to adjust the average head $h$ between the effluent E in the main tank and the clarified effluent CE within the drum (FIGS. 3, 5 and 12). It is box 106 that makes connection with the clarified effluent line 38, shown in FIGURE 1B.

Figure 8:
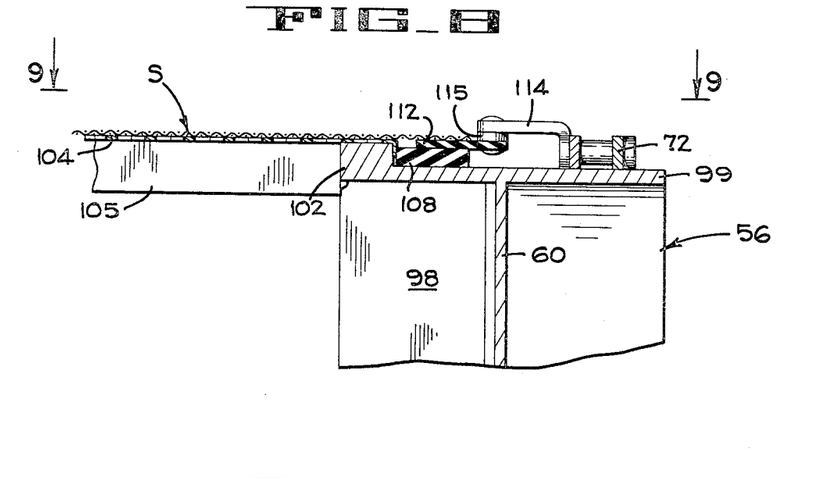
FIGURE 8 is a fragmentary enlarged section taken on line 8—8 of FIGURE 5, showing the sealing construction between the screen and drum.
Figure 9:
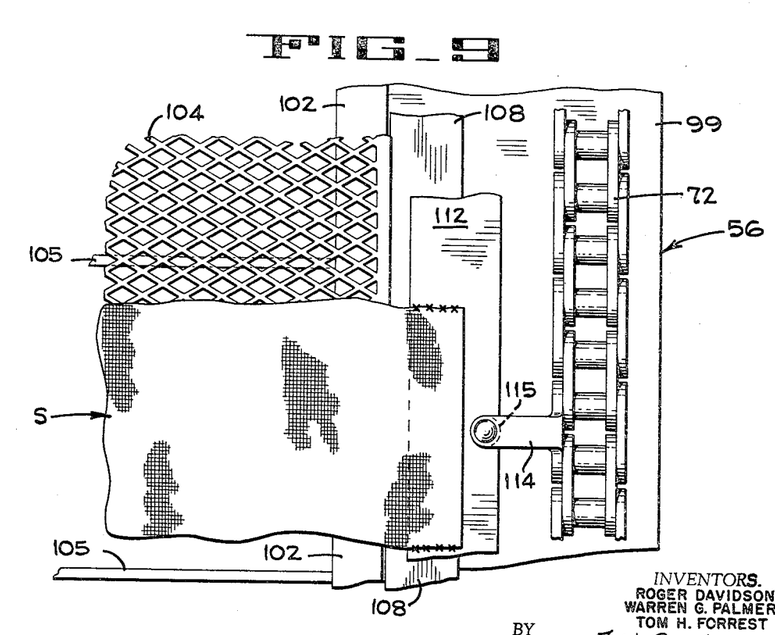
FIGURE 9 is a fragmentary plan looking in the direction of arrows 9—9 of FIGURE 8.

Preferred details relative to screen S, its chains and its mounting on the drum are shown in FIGURES 8 and 9. The construction at outlet side plate 60 of drum 56 appears in these figures; but the other side, a mirror image thereof, is not shown. The drum side plate 60 and the associated radial spokes 98 (best seen in FIGURE 5), which have their counterparts on the other side of the drum, merge with peripheral flange 99, as explained. Flange 99, is cylindrical and has a radial lip 102 to which is welded a cylindrical grid 104 of expanded metal. The grid 104 supports screen S against the water head $h$, while accommodating the flow of liquid radially inwardly from the exterior to the interior of the drum. The grid 104 is backed up by a series of circumferentially spaced, axially extending bars 105, welded at their opposite ends to flange portions 99 of the drum. The drum flanges are each provided with annular rings 108 of rubber, neoprene or other suitable gasket material, for making a liquid seal with screen S, and for driving the drum. Both sides of screen S are bonded along their lengths to a rubber or neoprene band 112. The band is riveted to ears 114, within spacers 115, which project inwardly from links of the roller chains 72. The chains are guided over the various pulleys, as described in connection with FIGURES 2–6.

In order to provide a friction drive for the drum, as well as a liquid seal, rubber bands 112 which as noted are bonded to the screen, are drawn against the rubber rings 108 (FIGURE 8) on the drum by tension on the screen assembly. Thus, water cannot flow from the main tank into the drum interior without passing through the screen. This is only true, however, when the water level in the main tank remains below the tangent points $t$, FIGS. 5 and 12, so that drum side plates 58 and 60 and the seals of FIGS. 8 and 9 are effective to block flow into the drum, except radial flow through the screen.

In practice it has been found that some effluents under clarification bear solids such as fats, greasy materials, etc., that are lighter than water, and these rise, sometimes in the form of a froth or foam, to the surface of the liquid in concentration chamber 52. These fatty and like relatively light solids tend to attach themselves to the cleaned, ascending reach of the screen as it emerges from the body of liquid material in the concentration chamber, and be dragged back into main tank 50. This is prevented by baffle 116 extending across chamber 52, which blocks floating solids 117 (FIGS. 5 and 12) from reaching the ascending run of the screen as it emerges from the liquid.

Figures 10, 11:
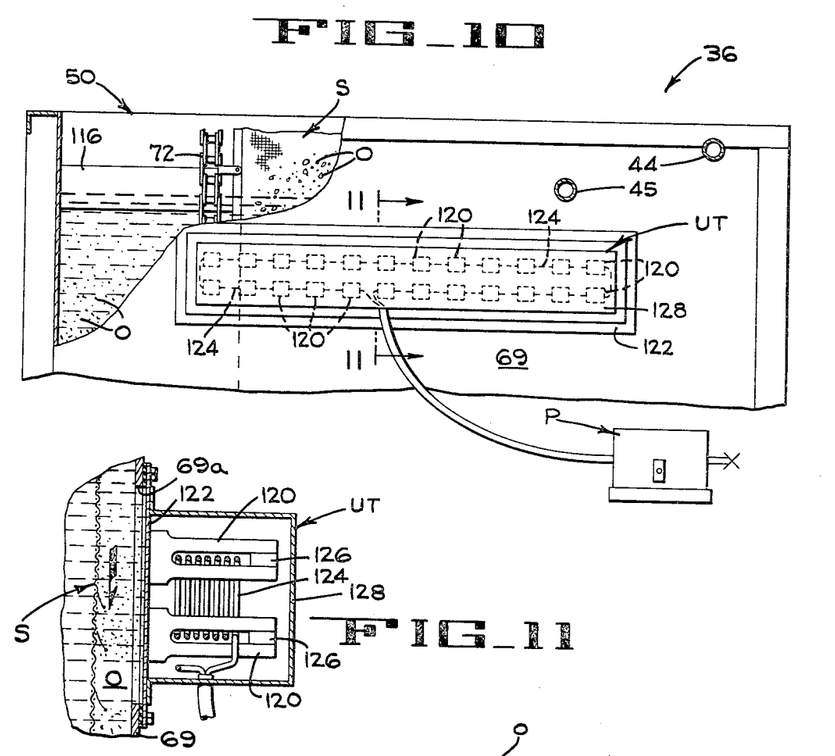
FIGURE 10 is an enlarged elevation showing the ultrasonic transducer mounting.
FIGURE 11 is a fragmentary enlarged section taken on line 11—11 of FIGURE 10, showing the mounting of the transducers.

FIGURES 10 and 11 show details of the mounting and construction of the ultrasonic transducer UT. The internal construction of the transducers is not critical to the present invention, transducers suitable for the application of the present invention being commercially available. As will be seen, however, the transducer is preferably one wherein heat generated therein is conducted to the make-up water. The transducer unit contains a series of magnetostrictive elements 120 energized by a high frequency power supply P which, in turn, receives line power. The magnetostrictive elements may be formed of sintered metals including nickel, cobalt or other magnetostrictive metals, commonly referred to as "ferrite" in this art. Also, crystalline materials exhibiting the piezo-electric effect, such as barium titanate, may be employed, as may nickel and certain nickel alloys.

The ultrasonic transducers 120 are bonded to a diaphragm plate 122 formed of stainless steel about $\frac{1}{16}''$ thick. Diaphragm plate 122 is secured to wall 69, this being the outer wall of concentrating chamber 52, over aperture 69a (FIG. 11) provided in the wall. Thus, the transducer diaphragm 122 is coupled directly to the concentrated suspension of solid organic material O in the concentrating chamber. In the installation of transducers indicated in the drawings, two rows of twelve (12) transducers are provided, and these are encompassed by a common winding 124 connected to the power supply P. The indicated installation is illustrative, and it is to be understood that the number, arrangement and other variables of the transducers may be altered to meet any desired need. The magnetostrictive units 120 include a polarizing magnet 126 (FIG. 11) to improve the excursion of the diaphragm and to magnetize the units. The transducers are protected by a cover 128.

The transducer diaphragm 122 is spaced from the screen S by a distance equal to about $\frac{1}{2}$ the wave length of the vibration, the distance being about $1\frac{1}{2}''$ at a frequency of 20,000 cycles per second. However, this position is not critical, and it has been found in practice that not only is the descending reach of the screen S cleaned, but the same reach as it travels and becomes as ascending reach, is clean even though it is some distance from the transducer diaphragm and has passed through the relatively concentrated solids-liquid suspension in the concentrating chamber.

The screen-transducer assembly arrangement in the upper portion of the concentrating chamber and the provision of a relatively quiescent zone below the same, as shown, not only brings about an enhanced cleaning of the screen, but an effective agglomeration of the stripped solids in the region below the screen and a consequently relatively rapid settling of the agglomerated solids into a concentrated slurry at the bottom of the chamber. These desirable effects of the invention appear to flow as a result of the heat imparted to the liquid in the region of the screen by the transducers. This warms the water in this region substantially, say by about 30° to 60° F., when the liquid is originally at a temperature of about 70° F., and to a more limited extent in the relatively quiescent solids-agglomerating and settling zone below the cleaning (solids stripping) zone. The heat generated by the transducers comes from the eddy current losses in cores 120 and the resistance losses in windings 124, and this heat is conducted to the liquid via diaphragm 122. The effectiveness of the screen transducer assembly is manifested at substantially all concentrations of solids which obtain in the cleaning zone when the concentration of solids in the screen zone is below about 150 p.p.m.

LIQUID LEVEL CONTROL

FIGURE 12 shows diagrammatically a liquid level control unit L for automatically controlling operation of the device, and for accommodating various modes of batch or intermittent operation. The control is of conventional design and includes lower and upper micro-switches 128, 130 which may be connected to a stop and start gearmotor (not shown) to vary its speed, or to control a solenoid valve (not shown) which may, suitably, be located in the inlet line 34 to the tank, or elsewhere, as desired. Several modes of operation using a control of this type will be fully described presently.

Summary of construction

To summarize the construction and operation of the device just described in the use of the invention being illustrated, i.e., the clarification of the secondary effluent from the settling tank in a sewage treatment plant where mixed sewage solids including activated sludge have been subjected to aeration, the effluent E from secondary settling tank 32 is introduced to tank portion 50 of clarification apparatus 36 through line 34. Drum 56 is rotated by the screen S to bring the screen into and out of tank 50. The rate of flow into the tank is maintained so that the level in the tank is as high as possible without rising above the tangent point $t$ (FIGURES 3 and 5) of the screen to the drum. If the water level in the main tank were to rise above the point $t$, water could flow directly through grid 104 (FIGURES 8 and 9) without first passing through the screen, and the efficiency of the device would be reduced.

As the liquid passes through the screen, the screen abstracts suspended solids and clarified effluent CE passes out from the interior of the drum through the tubes 96, 100 and over adjustable weir plate 109, as seen in FIGURE 6. The clarified effluent CE flows out through the line 38 for final disposition and for supplying the small amount of make-up water, as shown in FIGURE 1B.

Weir plate 109 is adjusted so that the water level of the clarified effluent CE within the drum is below that of the effluent E within the main tank 50 by a distance or head $h$, sufficient to provide the driving force necessary to cause effluent flow through the screen and into the interior of the drum. Also, for a given mesh screen, the drum is rotated at a linear speed adequate to maintain the head $h$, and solid organic and other materials in suspension in the effluent are removed from the screen in the treatment and concentration chamber by the ultrasonic transducer UT as described, thereby stripping solids from the screen. Should the screen become plugged this would be indicated by an increase in the head $h$.

The flow to clarification unit 36 is controlled so that the liquid does not reach a point wherein the level thereof rises above the tangent points $t$, as previously described. In the system being described, this is prevented by providing ample clarification capacity. If necessary, additional clarification units 36 can be connected to line 34 to provide added clarification capacity. Actually, under normal operating conditions, the liquid level within main tank 50 will be somewhat below the tangent points $t$, thereby accommodating slight increases in input to the tank, or random increases in the concentration of suspended solids in the liquid coming into the tank, beyond those normally expected. In addition to limiting the flow input to the unit itself, it is possible (within limits) to accommodate an increased flow rate or an increase in the percentage of suspended solids in the influent liquid, by speeding up the travel of the screen, suitably with variable speed drive gearmotor 74. It is also possible to increase the cleaning rate of the screen (within limits) by increasing the power supplied to the ultrasonic transducers UT, or by adding transducers to the wall of the treatment tank.

Action in the treatment and concentration chamber

FIGURE 12 is a schematic diagram of the apparatus showing the pickup action of the screen within the main tank as well as the action within the treatment and concentration chamber.

Due to the fact that the screen S is being continuously stripped of the screened solid organic and other materials which it picks up in the main tank, the clarified effluent E flows out of the apparatus as fast as the secondary effluent E flows into it. Therefore, under normal operation and as mentioned, a relatively steady state condition is attained, which establishes the head $h$ between the water level of E outside the drum and that of CE inside the drum. The flow through the screen is indicated schematically by the radially inwardly directed dashed arrows in FIGURE 12.

The suspended solids picked up from the liquid E in the main tank by screen S as it moves through the main tank between its tangent points $t$ with the drum, are indicated generally at 0 in FIGURE 12. As seen in this figure, the loading on the screen increases as the drum moves through the tank. It is to be noted, however, that the mass of this loading is exaggerated in FIGURE 12, for clarity of illustration.

As screen S passes down around the upper set of pulleys 86 and back up around the lower set 90, it passes through the "cleaning zone" in the treatment and concentration chamber 52. This zone is generally at the level of the transducers UT, as indicated in FIGURE 12. Here, the screen is stripped of the organic and other solid materials adhering thereto and these form a suspension, more or less of the temporary type, indicated generally by small dots, in the liquid normally within the treatment chamber. The transducers produce cavitation of the liquid in the treatment chamber and the forces generated thereby are effective within the chamber not only to strip the solids from the portion of the screen adjacent to the transducers, but also that portion remote therefrom as it passes upwardly from pulleys 90 for return to the main tank, with the result that as the screen leaves the "cleaning zone" it is substantially free from organic and other solid materials and thus there are no objectional solids dragged back into the main tank. Baffle 116 is provided to bar floating material 117 from reaching and depositing on the inner side of the ascending reach of the screen. This is desirable since otherwise solids removed from this side of the screen would at least in part settle and redeposit thereon.

The cavitational forces generated by the ultra-sonic transducer assembly UT manifest themselves not only on the liquid in the cleaning zone and thus aid in stripping of the solids from the screen, but also on the liquid in the zone below pulleys 90, albeit to a lesser extent, thereby aiding in agglomerating in the liquid the organic solid materials stripped from the screen, thus bringing about a more effective settling of the solids in this zone and a more concentrated slurry at the bottom thereof.

As already noted, the transducers impart heat to the liquid in the agglomeration zone, and this heat is beneficial because it appears to aid the solid organic materials in flocculating and agglomerating and thereby quicker settling to the bottom of the zone as a slurry, as illustrated diagrammatically in FIGURE 12. The concentrated slurry is withdrawn from the bottom of the zone through the line 40 for handling as already indicated.

Statistically, the average residence or detention time of a given organic solid particle removal from the screen in the treatment and concentration tank is substantial, and as already noted, these particles do not redeposit on the screen and thereby be carried back to the main tank. This substantial residence time coupled with the effective screen cleaning action and the thereafter solids agglomerating, settling and concentrating actions in accordance with the invention, make possible the removal from the starting material of all but an insubstantial amount of the organic solid materials originally present therein, in the form of a slurry having an unusually high concentration of solids, considering the nature of the solids in the starting material.

It has been found that the relative concentration of solids in the cleaning zone of the treatment chamber 52 can be permitted to rise to an unexpectedly high value in the region where the screen leaves the chamber, without interfering with the action of the transducers in effecting cleaning of the screen. The concentration of solids in this region can be permitted to rise to a point where the liquid is more or less opaque to the eye as a result of the organic solids therein (about 20,000 p.p.m., for example) and yet the screen emerges from the treatment tank free from substantial amounts of so-called "drag back" solids. Hence, the efficiency of the apparatus for removing organic solids from the starting material is maximized.

The long permissible residence time and the high concentrations of solids possible in the form of a slurry in the treating and concentrating chamber, make possible either continuous or batch removal of the concentrated slurry from the bottom of the treatment and concentrating chamber. Since the screen is not redirtied in this chamber even if the solids concentration level therein is high, considerable leeway as to the treatment chamber solids concentration is available, thereby facilitating batch removal of the slurry.

As mentioned, the level of liquid material in the treatment and concentration chamber is maintained by adding water through make-up line 44, in replacement of that withdrawn in the form of a slurry. However, since the concentration of solids is relatively high in the concentration zone at the bottom of the treatment chamber, the volume of the concentrated slurry removed is only a fraction of the total flow through the system which, in turn, means that the amount of make-up water required represents but a very small fraction of the total throughput of the system.

OPERATING EXAMPLE

With sewage treatment plant

Influent to apparatus.—Secondary effluent from the final settling tank of an activated sludge system. Contains about 20 p.p.m. of total suspended solids.

Influent flow rate.—250,000 gal./day.

Main tank.—6′ wide, 7′ long, 6½′ high (approx.) .Capacity 2,000 gallons.

Concentration (treatment) tank.—6′ wide, 1′ long, 6′ high (app.). Capacity 260 gallons.

Screen drum.—5′ diam. 4′ long traveling at ½ ft./min. peripheral speed.

Screen.—200 x 600 mesh woven cloth having nominal mesh openings of 25 microns. Screen dimensions 40″ wide and 27′ long. 12′ of screen immersed in main tank, 5′ of screen immersed in concentration tank.

Transducer.—As illustrated; or 2-Westinghouse units, Model MAGNATRAK–1000. Frequency 22,000 cycles/sec., total current drain 14 amps at 115 volts A.C. Mounted about one inch below upper liquid level of concentration tank on an outside wall, and about 1½″ from the microscreen. The Westinghouse units are each about 20″ long and 6″ wide, mounted end to end.

Flush water.—100 gal./day; taken from the clarified effluent output.

Concentration of slurry output.—20,000 p.p.m.

Average residence time of solids in concentration (treatment) tank.—Approximately 36 hours.

Figure 13:
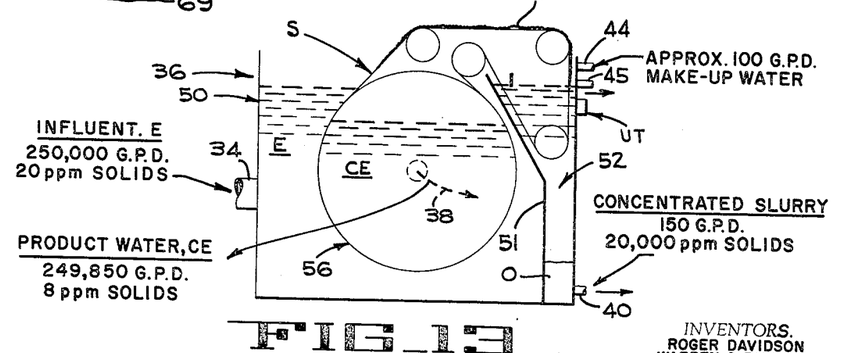
FIGURE 13 is a diagram indicating a typical operation in the clarifying and solids-concentrating apparatus of the invention.

FIGURE 13 illustrates diagrammatically the flow rates and concentrations given in the typical operating example. It will be noted that the influent water, which in the example is the secondary effluent E from a sewage treatment plant, is assumed to be 250,000 gallons per day (g.p.d.), having about 20 p.p.m. of solids suspended therein. The product water (the clarified effluent CE in the example) flows out of the apparatus at about the same rate, except for the relatively small volume of concentrated slurry withdrawn through line 40. Due to the highly efficient operation of the apparatus of the present invention, even when it is operated continuously, only about 150 gallons per day of concentrated slurry need be withdraw through line 40, even though a total volume of 250,000 gallons per day flows through the apparatus.

Clarified effluent CE contains about 8 parts per million of suspended solids, and can be readily disposed of without causing pollution problems. It will be noted that the concentration in the liquid removed from the treatment chamber 52 may reach the relatively high value of about 20,000 parts per million suspended solids, this representing a concentration increase of 1,000 times that of the influent. Of this removed material, about 100 gallons per day is water, the remainder being solids. Hence, approximately 100 gallons per day of make-up water is introduced into the treatment chamber via line 44. Looking at this another way, and as indicated in FIG. 1B, 99.94% by volume of secondary effluent E is discharged as clarified effluent or purified water. The percentage by volume of the influent which need be returned to the sewage treatment plant is only 0.06% of E, this being in the form of concentrates slurry. Thus, additional loading of the patent is negligible.

INTERMITTENT OR BATCH OPERATION

The unit has heretofore been described as operating in a steady state system wherein effluent E enters tank 50 continuously, the screen travels continuously, and concentrated slurry is withdrawn continuously through line 40. Other forms of operation are contemplated as being within the scope of the present invention and these will be briefly described by way of example.

(a) Intermittent screen operation.—The operation of screen S need not be continuous as previously described, and in that situation the operation is as follows: Assume the screen is stationary. When incoming liquid containing suspended solids rises in the tank 50 to a level above the bottom of the screen, liquid passes through the screen. When clarified liquid within the drum reaches a level sufficient to cause liquids to flow over the weir plate 109 (FIG. 6), liquid begins to flow through outlet line 38. While this is going on, solids begin to build up on screen S (FIG. 12) and these deposited solids impede the flow of additional liquid through the screen. In consequence, the liquid level of E, outside the screen, is higher by the distance $h$ than the level of clarified liquid CE inside the screen. With a continuation of the inflow of solids-containing liquid into the tank, and with a steady increase in deposits on the screen, the level of the solids-containing liquid E on the inlet side of the screen continues to rise. When the liquid differential $h$ between the solids-containing liquid E on the inlet side of the screen and the screened liquid CE on the outlet side reaches a predetermined value, float level control microswitch 130 is closed by the float arm. The gearmotor 74 (FIG. 3) is now energized to cause the screen to move and carry with it the screened solids for removal in water bath 52 as already described.

As the cleaned screen or clean screen portions are thus moved into tank 50, the liquid of the solids-containing liquid on the inlet side of the screen again flows readily therethrough with the result that the level differential $h$ referred to drops. When this level differential drops to some predetermined minimum value, and with the level within the screen being either at the outlet or somewhat above it, lower microswitch 128 is actuated to deenergize gearmotor 74 and stop the travel of the screen. Now the liquid level in tank 50, on the inlet side of the screen, again builds up until microswitch 130 is actuated and the gearmotor re-energized to cause the screen to travel. This intermittent type of operation can be scheduled for actuation and de-actuation of the movement of the screen for any desired time schedule in accordance with known apparatus and practices in the matter of the control of liquid levels in the fields of sewage, water treatment, industrial liquid waste treatment, etc.

(b) Intermittent feed operation.—A second mode of operation is as follows: The screen is placed in motion and a solenoid valve in the line 34 (not shown) is open when the lower microswitch 128 is closed by the float apparatus, causing flow into the tank 50 through the line 34. The liquid level rises to the point where the predetermined maximum differential $h$ exists between the solids-containing liquid on the inlet side of the screen and the clarified liquid side of the screen, at which time the upper switch 130 is actuated and the influent flow through line 34 is stopped by the solenoid valve. As the differential $h$ decreases because of the introduction of cleaned screen into the tank 50, at some predetermined liquid level, the lower switch 128 is again actuated, and the influent flow is restarted. This mode of operation causes the liquid E on the inlet side of the screen to oscillate between two predetermined limits by modulating the influent flow. As an example of the excursions in liquid level described as predetermined, the maximum liquid level differential may be 6", with a minimum differential of 4 inches.

(c) *Variable speed screen.*—A third mode of operation is as follows: Referring again to the predetermined desired limits of liquid level on the inlet side of the screen, the belt speed is modulated in such a manner that the flow capacity of the machine is varied, resulting in liquid level excursions. A liquid level sensor such as float mechanism L, actuating speed changing of variable speed gearmotor 74, yields the desired action through techniques that are well known in the control art.

The preferred construction of the drum for radial feed is that described wherein the flow through the screen is radially inward. This facilitates supporting screen S proper against the head $h$, the expanded metal grid 104 serving as the support. However, the invention, in its broader aspect is not limited to a radial infeed drum, a radial outfeed drum may also be used. If a radial outfeed drum were employed, the drum axle would be hollow for receiving the unclarified liquid, as in Lamont, 1,945,492. Accordingly, unless otherwise specified, the term "radial feed," as employed in the appended claims, is considered applicable to either infeed or outfeed drums.

The term "ultrasonic vibrations," etc. as employed herein refers to vibrations in the order of 15 to 40 kilocycles/sec.

Having completed a detailed description of the invention so that those skilled in the art could practice the same, we claim:

1. A method of removing solids from an aqueous suspension of the same in a tank having an inlet for said suspension and an outlet for clarified aqueous medium, wherein an endless moving screen having openings smaller than at least some of the solids travels through the tank between the inlet and outlet and into a zone containing a body of liquid separated from the aforesaid aqueous suspension, comprising flowing the said aqueous suspension through the inlet and into the tank and then through the screen as the screen passes through the tank and simultaneously withdrawing liquid which has passed through the screen from the tank through said tank outlet, thereby depositing suspended solids on said screen as the same travels through the tank, carrying the deposited solids on the moving screen into the body of liquid in the said zone and while the same is there, subjecting the said body of liquid to ultrasonic vibrations to impart to the deposited solids loosening forces, thereby disloding the solids from the screen and suspending the same in the liquid in the said zone, causing the suspended solids while still under the influence of the ultrasonic vibrations, to settle and concentrate in the liquid at the bottom of said zone, moving the screen from which the solids have been dislodged from the said zone to the tank for further removal of solids from the aqueous suspension in the tank, as aforesaid, and removing concentrated solids from the bottom of said zone.

2. The method of claim 1, wherein the volume of concentrated solids thus removed from said zone is replaced by adding water to the body of liquid in said zone.

3. The method of claim 1, wherein the body of liquid in said zone is heated above ambient temperature for enhancing the loosening forces engendered by the ultrasonic vibrations.

4. The method of claim 1, wherein the screen is moved through only an upper portion of the body of liquid in said zone and simultaneously ultrasonic vibrations are applied to the body of liquid in the said portion in proximity to said screen.

5. The method of claim 1, wherein direct application of ultrasonic vibrations to the body of liquid in said zone is made only at an upper portion of the zone.

6. The method of claim 5, wherein the screen is moved through only an upper portion of the body of liquid in said zone.

7. The method of claim 6, wherein the solids dislodged from the screen are agglomerated as they settle to the bottom of said zone.

8. The method of clarifying a highly dilute aqueous suspension of solid organic material comprising the steps of abstracting suspended solid organic material from the aqueous suspension by flowing the suspension through a screen to deposit solid organic material thereon, withdrawing the thus clarified liquid, introducing the material-laden screen into an upper portion of a relatively concentrated aqueous suspension of the same organic material that is developed in a zone separated from the aforesaid dilute suspension and simultaneously stripping the solid organic material from the screen by subjecting the said relatively concentrated suspension in the region of said material-laden screen to cavitation by the application thereto of ultrasonic vibrations, adding the stripped solids to the surrounding concentrated aqueous suspension, causing the stripped solids to settle in the suspension while maintaining them under the influence of the applied ultrasonic vibrations to cause the solids to agglomerate as they settle and ultimately concentrate at the bottom of said concentrated suspension as a slurry, and removing the slurry from the bottom of said zone.

9. The method of claim 8, wherein water is added to the concentrated suspension for making up the volume of slurry removed.

10. The method of clarifying a sewage effluent containing minute particles of suspended solids including organic materials in amounts not substantially exceeding about 100–150 parts per million, comprising the steps of abstracting suspended solids from the effluent by flowing the effluent through a fine mesh screen to deposit solids thereon to reduce the solids content of the screened effluent to a suspended solids content not substantially exceeding about 20–30 parts per million, withdrawing the thus clarified effluent, introducing the solids-laden screen into a relatively concentrated aqueous suspension of solids previously removed from the screen but in a zone separated from the aforesaid effluent, subjecting the said relatively concentrated suspension containing the solids-laden screen to cavitation by the application of ultrasonic vibrations to the suspension, thereby stripping previously deposited solids from the screen and adding them to surrounding portions of the relatively concentrated suspension, maintaining the solids thus removed from the screen under the influence of the ultrasonic vibrations as the solids settle to cause the solids to flocculate and finally concentrate at the bottom of said zone as a slurry, and removing the slurry from the bottom of said zone.

11. The method of claim 10, wherein the slurry concentration is in the order to 20,000 parts per million or higher.

12. The method of claim 10, wherein the relatively concentrated suspension is heated above ambient temperature for promulgating both cavitation at the screen and flocculation of the solids stripped from the screen by that cavitation as they settle.

13. The method of claim 10, wherein liquid is added to the concentrated suspension for making up the volume of slurry removed.

14. The method of claim 13, wherein the screen is endless and portions along its length are successively moved back and forth between the effluent and the concentrated suspension.

15. Apparatus for clarifying a liquid suspension of solids comprising a main and an auxiliary compartment for receiving liquids, means for introducing the unclarified liquid suspension into the main compartment and for removing clarified liquid therefrom, a screen of a mesh fine enough to retain the suspended solids, means for moving said screen between said compartments for transfer of screened solids from the main to the auxiliary compartment, an ultrasonic transducer mounted for imparting vibrations to the liquid in said auxiliary compartment for stripping screened solids from the screen as a result of cavitation of the liquid induced by the vibrations, whereby the stripped solids are suspended in the liquid and settle to and concentrate as a slurry in the bottom of the auxiliary compartment, means for withdrawing slurry from the lower zone of said auxiliary compartment, and means for making up the amount of liquid withdrawn therefrom.

16. The apparatus of claim 15, wherein means are provided so that said slurry withdrawal means and said liquid make-up means may operate substantially continuously during the normal functioning of the apparatus.

17. The apparatus of claim 15, wherein said ultrasonic transducer is mounted at an upper portion of said auxiliary compartment.

18. The apparatus of claim 17, wherein said ultrasonic transducer embodies a diaphragm wall of said auxiliary compartment for transmitting both ultrasonic vibrations and heat generated in the transducer to the liquid in the auxiliary compartment.

19. The apparatus of claim 17, wherein said screen is a continuous belt-like member that passes through both compartments.

20. The apparatus of claim 19, wherein said screen passes through only an upper portion of said auxiliary compartment for accommodating agglomeration of the stripped solids below the screen as they settle to the bottom of the compartment.

21. Apparatus for clarifying a dilute aqueous suspension of organic solids comprising a main tank and an auxiliary compartment, a radial feed drum in said main tank, a fine mesh belt screen, means for training said screen around said drum and through an upper zone only of said auxiliary compartment, means for supplying the unclarified suspension to said main tank and flowing it through said screen, means for withdrawing the clarified suspension from said main tank, means for providing a body of water in said auxiliary compartment including a relatively concentrated suspension of solids removed from said main tank via the screen, an ultrasonic transducer mounted for imparting vibrations to an upper zone of the liquid in said auxiliary compartment for stripping the screen of solids in the upper portion of said auxiliary compartment, inducing agglomeration of the solids in an intermediate zone, and concentration of the solids into a slurry bed at the lowermost zone, discharge means for withdrawing said concentrated slurry from said auxiliary compartment, and means for maintaining the liquid level in said auxiliary tank to make up for the volume of withdrawn slurry.

22. The apparatus of claim 21, wherein means are provided to withdraw the solids in said slurry continuously and at substantially the same rate that solids are introduced into said auxiliary compartment by said screen.

23. The apparatus of claim 21, wherein said ultrasonic transducer embodies a diaphragm that forms an upper wall portion of said auxiliary compartment and is parallel to an adjacent reach of the screen.

24. The apparatus of claim 23, wherein said ultrasonic transducer includes magnetostrictive elements bonded to said diaphragm wall for conducting heat generated at the elements to the liquid in said auxiliary compartment.

References Cited
UNITED STATES PATENTS

| | | | |
|---|---|---|---|
| 82,735 | 10/1868 | Merrill | 210—401 X |
| 201,602 | 3/1878 | Fisher | 210—391 X |
| 1,967,310 | 7/1934 | Kent | 210—401 X |

SAMIH N. ZAHARNA, Primary Examiner

F. A. SPEAR, JR., Assistant Examiner

U.S. Cl. X.R.

210—77, 79, 384, 386, 387, 391, 401

PO-1050
(5/69)

UNITED STATES PATENT OFFICE
CERTIFICATE OF CORRECTION

Patent No. 3,489,679  Dated January 13, 1970

Inventor(s) R. DAVIDSON et al

It is certified that error appears in the above-identified patent and that said Letters Patent are hereby corrected as shown below:

Column 7, line 61, change "inng" to -- ing --. Column 11, line 71, after "influent" change the comma to a period. Column 13, line 49, change "loding" to -- lodging --.

SIGNED AND
SEALED
DEC 8 1970

(SEAL)
Attest:

Edward M. Fletcher, Jr.
Attesting Officer

WILLIAM E. SCHUYLER, JR.
Commissioner of Patents